(12) United States Patent
Jacobs et al.

(10) Patent No.: US 6,225,407 B1
(45) Date of Patent: May 1, 2001

(54) POLYMER BLEND

(75) Inventors: Alexandra Jacobs, Niedernhausen; Klaus Berger, Kriftel; Wilfried Hatke, Hofheim, all of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/334,334

(22) Filed: Jun. 16, 1999

(30) Foreign Application Priority Data

Jun. 16, 1998 (DE) .............................................. 198 26 425
Nov. 19, 1998 (DE) .............................................. 198 53 349

(51) Int. Cl.$^7$ .................................................. C08G 63/48
(52) U.S. Cl. ............................................................. 525/70
(58) Field of Search .................................................. 525/70

(56) References Cited

U.S. PATENT DOCUMENTS

| | | | |
|---|---|---|---|
| 5,324,801 | 6/1994 | Brekner et al. | 526/160 |
| 5,545,829 | 8/1996 | Brekner et al. | 526/160 |
| 5,602,219 | 2/1997 | Aulbach et al. | 526/160 |
| 5,629,398 | 5/1997 | Okamoto et al. | 526/281 |
| 5,733,991 | 3/1998 | Rohrmann et al. | 526/160 |
| 5,753,755 | * 5/1998 | Shachi et al. | 525/95 |
| 5,756,623 | 5/1998 | Kreuder et al. | 526/308 |
| 5,863,986 | 1/1999 | Herrmann-Schönherr et al. | 525/63 |
| 5,869,586 | 2/1999 | Riedel et al. | 526/170 |

FOREIGN PATENT DOCUMENTS

| | | |
|---|---|---|
| 0 504 418 A1 | 9/1992 | (EP) . |
| 661 345 | 7/1995 | (EP) . |
| 0 729 977 | 4/1996 | (EP) . |
| 761 752 | 3/1997 | (EP) . |
| WO 94/17113 | 4/1994 | (WO) . |
| 0 610 851 | 8/1994 | (WO) . |
| 97/46617 | 12/1997 | (WO) . |
| WO 98/27126 | 6/1998 | (WO) . |

OTHER PUBLICATIONS

Database, WPI, Section Ch, Week 9825, Derwent Publications Ltd., London GB; Class A17, AN 98–280460, XP002116556 & JP 10 095881 A (Mitsui Petrochem Ind. Co. Ltd(, Apr. 14, 1998.
Patents Abstracts of Japan, vol. 095, No. 009, (Oct. 31, 1995 & JP 07 166009 A (Toppan Printing Co. Ltd (Jun. 27, 1995.
Patent Abstracts of Japan, vol. 095, No. 009, Oct. 1, 1995 & JP 07 166008 A (Toppan Printing Co. Ltd (Jun. 27, 1995).
Patent Abstacts of Japan, vol. 018, No. 520 (c–1255), Sep. 30, 1994 & JP 06 179781 A (Mitsui Petrochem Ind Ltd) (Jun. 28, 1994).
Miyake S. et al., "Highly Isospecific Polymerization of Propylene with Unsymmetrical Metallocene Catalysts" Macromolecules, 28(9):3074–3079 (Apr. 24, 1995).

* cited by examiner

Primary Examiner—Terressa M. Boykin
(74) Attorney, Agent, or Firm—Connolly Bove Lodge & Hutz LLP

(57) ABSTRACT

The present invention relates to a polymer blend comprising one or more cycloolefin copolymers and one or more types of core-shell particles or one or more copolymers which are composed to some extent of rubbers with low glass transition temperatures, or a combination of one or more types of core-shell particles and of one or more copolymers which are composed to some extent of rubbers with low glass transition temperatures.

20 Claims, No Drawings

POLYMER BLEND

The present invention relates to polymer blends made from cycloolefin copolymers (COC) and from impact modifiers. The novel polymer blends are impact-resistant and have high flexural strength and elongation at break, and improved processability.

Impact-modified polymers are well known and are suitable for a wide variety of applications (C. B. Bucknall, Toughened Plastics, Applied Science Publishers, London 1977; A. E. Platt, Rubber Modification of Plastics, Advances in Polymer Science, page 437).

It is also known that the impact resistance and the elongation at break of polymers can be improved by blending. For example, the impact resistance of brittle polymers can be improved by blending with polymer systems which are composed entirely or partially of rubbers with low glass transition temperatures, or by blending with core-shell particles, or by combining these modifiers. The morphologies obtained here, and therefore also the mechanical properties, are highly dependent on the processing conditions used (G. H. Michler, Kunststoff-Mikromechanik [Micromechanics of Plastics], Hanser, Munich 1992, page 281 et seq.; A. E. Platt, Rubber Modification of Plastics, Advances in Polymer Science, page 437; P. A. Lovell et al., Polymer, 34 (1993), page 61).

Polymer blends of cycloolefin copolymers are also known. EP-A-0 647 677 and EP-A-0 647 676 describe blends with core-shell particles. EP-A-0 661 345 combines core-shell particles with copolymers which are composed to some extent of rubbers with low glass transition temperatures.

PCT 97/46617 describes polymer blends of cycloolefin copolymers with copolymers which are composed to some extent of rubbers with low glass transition temperatures.

The materials obtained by blending the cycloolefin copolymers described do not have the impact resistance required for industrial applications.

The object of the present invention is to prepare a polymer with impact resistance sufficiently high for industrial applications.

It has been found that a novel polymer blend which comprises one or more cycloolefin copolymers and a) one or more types of core-shell particles, or b) one or more copolymers which are composed to some extent of rubbers with low glass transition temperatures, or c) a combination of one or more types of core-shell particles and of one or more copolymers which are composed to some extent of rubbers with low glass transition temperatures has impact resistance which is sufficiently high for industrial applications.

The novel polymer blend comprises at least one cycloolefin copolymer which is prepared by polymerizing from 0.1 to 99.9% by weight, based on the total amount of the monomers, of at least one polycyclic olefin of the formula I, II, II', III, IV or V where $R^1$, $R^2$, $R^3$, $R^4$, $R^5$, $R^6$, $R^7$ and $R^8$ are identical or different and are a hydrogen atom or a hydrocarbon radical, where the same radicals in the different formulae may have a different meaning, and from 0 to 99.9% by weight, based on the total amount of the monomers, of at least one monocyclic olefin of the formula VI where n is a number from 2 to 10, and from 0.1 to 99% by weight, based on the total amount of the monomers, of at least one acyclic 1-olefin of the formula VII where $R^9$, $R^{10}$, $R^{11}$ and $R^{12}$ are identical or different and are a hydrogen atom or a hydrocarbon radical, preferably a $C_6$–$C_{10}$-aryl radical or a $C_1$–$C_8$ alkyl radical.

Preference is given to cycloolefins of the formulae I or III, where $R^1$, $R^2$, $R^3$, $R^4$, $R^5$, $R^6$, $R^7$ and $R^8$ are identical or different and are a hydrogen atom or a hydrocarbon radical, in particular a ($C_6$–$C_{10}$)-aryl radical or a ($C_1$–$C_8$)-alkyl radical, where the same radicals in the different formulae may have a different meaning.

If desired, the polymerization may use one or more monocyclic olefins of the formula VI.

Preference is also given to an acyclic olefin of the formula VII, where $R^9$, $R^{10}$, $R^{11}$ and $R^{12}$ are identical or different and are a hydrogen atom or a hydrocarbon radical, preferably a $C_6$–$C_{10}$-aryl radical or a $C_1$–$C_8$-alkyl radical, for example ethylene or propylene.

The copolymers prepared are in particular those of polycyclic olefins, preferably of the formulae I and III, with ethylene.

Particularly preferred polycyclic olefins are norbornene and tetracyclododecene, where these may have $C_1$–$C_6$-alkyl substitution. They are preferably copolymerized with ethylene. Very particular preference is given to ethylene-norbornene copolymers and ethylene-tetracyclododecene copolymers.

The novel polymer blend is characterized in that the cycloolefin copolymer(s) present are prepared by the process described below. The process for preparing the cycloolefin copolymers present in the novel polymer blend is described in detail in DE-A-196 52 340, which is expressly incorporated herein by way of reference.

The process according to the invention for preparing a cycloolefin copolymer encompasses the polymerization of from 0.1 to 99.9% by weight, based on the total amount of the monomers, of at least one polycyclic olefin, and from 0 to 99.9% by weight, based on the total amount of the monomers, of at least one monocyclic olefin, and from 0.1 to 99.9% by weight, based on the total amount of the monomers, of at least one acyclic 1-olefin, in the presence of a catalyst system. The catalyst system to be used for preparing the cycloolefin copolymer present in the novel polymer blend comprises at least one transition metal compound. Preference is given to the use of one or more metallocenes as transition metal compound.

The polymerization is carried out in the liquid cycloolefin itself or in a cycloolefin solution. The pressure is usefully above 1 bar.

The catalyst system to be used in preparing the cycloolefin copolymer present in the novel polymer blend may moreover comprise one or more cocatalysts.

The catalyst system to be used for preparing the cycloolefin copolymer present in the novel polymer blend is a high-activity catalyst for olefin polymerization. Preference is given to using a metallocene and a cocatalyst. It is also possible to use mixtures of two or more metallocenes, particularly for preparing reactor blends or polyolefins with a broad or multimodal molar mass distribution.

The process for preparing the cycloolefin copolymer present in the novel polymer blend, and also the catalyst system to be used for this process, are described in detail in DE-A-1 96 52 340, which is expressly incorporated herein by way of reference.

The cocatalyst present in the catalyst system to be used for preparing the cycloolefin copolymer present in the novel polymer blend preferably comprises an aluminoxane.

Examples of the metallocenes to be used according to the invention are:
isopropylene(1-indenyl)(3-methylcyclopentadienyl)zirconium dichloride,
diphenylmethylene(1-indenyl)(3-methylcyclopentadienyl)zirconium dichloride,
methylphenylmethylene(1-indenyl)(3-methylcyclopentadienyl)zirconium dichloride,
isopropylene(1-indenyl)(3-isopropylcyclopentadienyl)zirconium dichloride,
diphenylmethylene(1-indenyl)(3-isopropylcyclopentadienyl)zirconium dichloride,
methylphenylmethylene(1-indenyl)(3-isopropylcyclopentadienyl)zirconium dichloride,
isopropylene(1-indenyl)(3-tert-butylcyclopentadienyl)zirconium dichloride,
diphenylmethylene(1-indenyl)(3-tert-butylcyclopentadienyl)zirconium dichloride
methylphenylmethylene(1-indenyl)(3-tert-butylcyclopentadienyl)zirconium dichloride,
isopropylene(1-indenyl)(3-trimethylsilylcyclopentadienyl)zirconium dichloride,
diphenylmethylene(1-indenyl)(3-trimethylsilylcyclopentadienyl)zirconium dichloride,
methylphenylmethylene(1-indenyl)(3-trimethylsilylcyclopentadienyl)-zirconium dichloride,
isopropylene(4,5,6,7-tetrahydro-1-indenyl)(3-trimethylsilylcyclopentadienyl)-zirconium dichloride,
diphenylmethylene(1-indenyl)(3-trimethylsilylcyclopentadienyl)zirconium dichloride,
methylphenylmethylene(1-indenyl)(3-trimethylsilylpentadienyl)zirconium dichloride,
isopropylene(4,5,6,7-tetrahydro-1-indenyl)(3-trimethylsilylcyclopentadienyl)-zirconium dichloride;
isopropylene(1-indenyl)(3,4-dimethylcyclopentadienyl)zirconium dichloride,
diphenylmethylene(4,5,6,7-tetrahydro-1-indenyl)(3-trimethylsiiyicyclopentadienyl)zirconium dichloride,
methylphenylmethylene(4,5,6,7-tetrahydro-1-indenyl)(3-trimethylsilylcyclopentadienyl)zirconium dichloride,
isopropylene(1-indenyl)(3,4-di-trimethylsilylcyclopentadienyl)zirconium dichloride,
diphenylmethylene(1-indenyl)(3,4-di-trimethylsiiylcyclopentadienyl)-zirconium dichloride,
methylphenylmethylene(1-indenyl)(3,4-di-trimethylsilylcyclopentadienyl)-zirconium dichloride,
isopropylene(1-indenyl)(2,3-di-trimethylsiiylcyclopentadienyi)zirconium dichloride,
diphenylmethylene(1-indenyl)(2,3-di-trimethylsilylcyclopentadienyl)-zirconium dichloride,
methylphenylmethyiene(1-indenyl)(2,3-di-trimethylsilylcyclopentadienyl)-zirconium dichloride,
isopropylene(1-indenyl)(3,4-dimethyl(cyclopentadienyl)zirconium dichloride,
diphenylmethylene(1-indenyi)(3,4-dimethylcyclopentadienyl)zirconium dichloride,
methylphenylmethylene(1-indenyl)(3,4-dimethyicyclopentadienyl)zirconium dichloride,
diphenylmethylene(1-indenyl)(3,4-diethylcyclopentadienyi)zirconium dichloride,
methylphenylmethylene(1-indenyl)(3,4-diethylcyclopentadienyl)zirconium dichloride,
isopropylene(1-indenyl)(3,4-diisopropylcyclopentadienyl)zirconium dichloride,
diphenylmethylene(1-indenyl)(3,4-diisopropylcyclopentadienyl)zirconium dichioride,
methylphenylmethylene(1-indenyl)(3,4-diisopropylcyclopentadienyl)-zirconium dichloride,
isopropylene(1-indenyl)(3,4-diethylcyclopentadienyl)zirconium dichloride,
isopropylene(1-indenyl)(3,4-di-tert-butylcyclopentadienyl)zirconium dichloride,
diphenylmethylene(1-indenyl)(3,4-di-tert-butylcyclopentadienyl)zirconium dichloride,
methylphenylmethylene(1-indenyl)(3,4-di-tert-butylcyclopentadienyl)-zirconium dichloride,
isopropylene(1-indenyl)(2,3-dimethyicyclopentadinyl)zirconium dichloride,
diphenylmethylene(1-indenyl)(2,3-dimethylcyclopentadienyl)zirconium dichloride,
methylphenylmethylene(1-indenyl)(2,3-dimethylcyclopentadienyl)zirconium dichloride,
isopropylene(1-indenyl)(2,3-diethylcyclopentadienyl)zirconium dichloride, diphenylmethylene(1-indenyl)(2,3-diethylcyclopentadienyl)zirconium dichloride,
methylphenylmethylene(1-indenyl)(2,3-diethylcyclopentadienyl)zirconium dichloride,
isopropylene(1-indenyl)(2,3-diisopropylcyclopentadienyl) zirconium dichloride,
diphenylmethylene(1-indenyl)(2,3-diisopropylcyclopentadienyl)zirconium dichloride,
methylphenylmethylene(1-indenyl)(2,3-diisopropylcyclopentadienyl)-zirconium dichloride,
isopropylene(1-indenyl)(2,3-di-tert-butylcyclopentadienyl) zirconium dichloride,
diphenylmethylene(1-indenyl)(2,3-di-tert-butylcyclopentadienyl)zirconium dichloride,
methylphenylmethylene(1-indenyl)(2,3-di-tert-butylcyclopentadienyl)-zirconium dichloride,
isopropylene(1-indenyl)(tetramethylcyclopentadienyl) zirconium dichloride,
diphenylmethylene(1-indenyl)(tetramethylcyclopentadienyl)zirconium dichloride,
methylphenylmethylene(1-indenyl) (tetramethylcyclopentadienyl)zirconium dichloride,
isopropylene(4,5,6,7-tetrahydro-1-indenyl)(3-methylcyclopentadienyl)-zirconium dichloride,
diphenylmethylene(4,5,6,7-tetrahydro-1-indenyl)(3-methylcyclopentadienyl)zirconium dichloride,
methylphenylmethylene(4,5,6,7-tetrahydro-1-indenyl)(3-methylcyclopentadienyl)zirconium dichloride,
isopropylene(4,5,6,7-tetrahydro-1-indenyl)(3-ethylcyclopentadienyl)-zirconium dichloride,
diphenylmethylene(4,5,6,7-tetrahydro-1-indenyl) (3-ethylcyclopentadienyl)zirconium dichloride,
methylphenylmethylene(4,5,6,7-tetrahydro-1-indenyl) (3-ethylcyclopentadienyl)zirconium dichloride,
(isopropylcyclopentadienyl)zirconium dichloride,
isopropylene(4,5,6,7-tetrahydro-1-indenyl)(3-isopropylcyclopentadienyl)-zirconium dichloride,
diphenylmethylene(4,5,6,7-tetrahydro-1-indenyl)(3-isopropylcyclopentadienyl)zirconium dichloride,
methylphenylmethylene(4,5,6,7-tetrahydro-1-indenyl) (3-isopropylcyclopentadienyl)zirconium dichloride,
isopropylene(4,5,6,7-tetrahydro-1-indenyl)(3-tert-butylcyclopentadienyl)-zirconium dichloride,
diphenylmethylene(4,5,6,7-tetrahydro-1-indenyl)(3-tert-butylcyclopentadienyl)zirconium dichloride,
methylphenylmethylene(4,5,6,7-tetrahydro-1-indenyl)(3-tert-butylcyclopentadienyl)zirconium dichloride,
isopropylene(4,5,6,7-tetrahydro-1-indenyl)(3,4-dimethylcyclopentadienyl)-zirconium dichloride,
diphenylmethylene(4,5,6,7-tetrahydro-1-indenyl)(3,4-dimethyicyclopentadienyl)zirconium dichloride,
methylphenylmethylene(4,5,6,7-tetrahydro-1-indenyl)(3,4-dimethylcyclopentadienyl)zirconium dichloride,
isopropylene(4,5,6,7-tetrahydro-1-indenyl)(3,4-diethylcyclopentadienyl)-zirconium dichloride,
diphenylmethylene(4,5,6,7-tetrahydro-1-indenyl)(3,4-diethylcyclopentadienyl)zirconium dichloride,
methylphenylmethylene(4,5,6,7-tetrahydro-1-indenyl)(3,4-diethylcyclopentadienyl)zirconium dichloride,
isopropylene(4,5,6,7-tetrahydro-1-indenyl)(3,4-diisopropylcyciopentadienyl)zirconium dichloride,
diphenylmethylene(4,5,6,7-tetrahydro-1-indenyl)(3,4-diisopropylcyclopentadienyl)zirconium dichloride,
methylphenylmethylene(4,5,6,7-tetrahydro-1-indenyl)(3,4-diisopropylcyclopentadienyl)zirconium dichloride,
isopropylene(4,5,6,7-tetrahydro-1-indenyl)(3,4-dibutylcyclopentadienyl)-zirconium dichloride,
diphenylmethylene(4,5,6,7-tetrahydro-1-indenyl)(3,4-di-tert-butylcyclopentadienyl)zirconium dichloride,
methylphenylmethylene(4,5,6,7-tetrahydro-1-indenyl) (3,4-di-tert-butyicyclopentadienyl)zirconium dichloride,
isopropylene(4,5,6,7-tetrahydro-1-indenyl)(2,3-dimethylcyclopentadienyl)-zirconium dichloride,
diphenylmethylene(4,5,6,7-tetrahydro-1-indenyl)(2,3-dimethylcyclopentadienyl)zirconium dichloride,
methylphenylmethylene(4,5,6,7-tetrahydro-1-indenyl)(2,3-dimethylcyclopentadienyl)zirconium dichioride,
isopropylene(4,5,6,7-tetrahydro-1-indenyl)(2,3-methylcyclopentadienyl)zirconium dichloride,
diphenylmethylene(4,5,6,7-tetrahydro-1-indenyl)(2,3-diethylcyclopentadienyl)zirconium dichloride,
methylphenyimethylene(4,5,6,7-tetrahydro-1-indenyl)(2,3-diethylcyclopentadienyl)zirconium dichloride,
isopropylene(4,5,6,7-tetrahydro-1-indenyl)(2,3-diisopropylcyclopentadienyl)zirconium dichloride,
diphenylmethylene(4,5,6,7-tetrahydro-1-indenyl)(2,3-diisopropylcyclopentadienyl)zirconium dichloride,
methylphenylmethylene(4,5,6,7-tetrahydro-1-indenyl)(2,3-diisopropylcyclopentadienyl)zirconium dichloride,
isopropylene(4,5,6,7-tetrahydro-1-indenyl)(2,3-di-tert-butyicyclopentadienyl)-zirconium dichloride,
diphenylmethylene(4,5,6,7-tetrahydro-1-indenyl)(2,3-di-tert-butylcyclopentadienyl)zirconium dichloride,
methylphenylmethylene(4,5,6,7-tetrahydro-1-indenyl)(2,3-di-tert-butylcyclopentadienyl)zirconium dichloride,
isopropylene(4,5,6,7-tetrahydro-1-indenyl) (tetramethylcyclopentadienyl)-zirconium dichloride,
diphenylmethylene(4,5,6,7-tetrahydro-1-indenyl) (tetramethylcyclopentadienyl)zirconium dichloride,
methylphenylmethylene(4,5,6,7-tetrahydro-1-indenyl) (tetramethylcyciopentadienyl)zirconium dichloride.

Particular preference is given to:
isopropylene(1-indenyl)(3-isopropylcyclopentadienyl) zirconium dichloride,
diphenyimethylene(1-indenyl)(3-isopropylcyclopentadienyl)zirconium dichloride,
methylphenylmethylene(1-indenyl)(3-isopropylcyclopentadienyl)zirconium dichloride,
isopropylene(1-indenyl)(3-tert-butylcyclopentadienyl) zirconium dichloride,
diphenylmethylene(1-indenyl)(3-tert-butylcyclopentadienyl)zirconium dichloride,
methylphenylmethylene(1-indenyl)(3-tert-butylcyclopentadienyl)zirconium dichloride,
isopropylene(4,5,6,7-tetrahydro-1-indenyl)(3-isopropylcyclopentadienyl)-zirconium dichloride,
diphenylmethylene(4,5,6,7-tetrahydro-1-indenyl)(3-isopropylcyclopentadienyl)zirconium dichloride,
methylphenylmethylene(4,5,6,7-tetrahydro-1-indenyl)(3-isopropylcyclopentadienyl)zirconium dichloride,
isopropylene(1-indenyl)(3-trimethylsilylcyclopentadienyl) zirconium dichloride,
diphenylmethylene(1-indenyl)(3-trimethylsilylcyclopentadienyl)zirconium dichloride,
methylphenylmethylene(1-indenyl)(3-trimethylsilylcyclopentadienyl)-zirconium dichioride,
isopropylene(4,5,6,7-tetrahydro-1-indenyl)(3-tert-butylcyclopentadienyl)-zirconium dichloride,
diphenylmethylene(4,5,6,7-tetrahydro-1-indenyl)(3-tert-butylcyclopentadienyl)zirconium dichloride,
methylphenylmethylene(4,5,6,7-tetrahydro-1-indenyl)(3-tert-butylcyclopentadienyl)zirconium dichloride,
isopropylene(4,5,6,7-tetrahydro-1-indenyl)(3-trimethylsilylcyclopentadienyl)-zirconium dichloride, diphenylmethylene(4,5,6,7-tetrahydro-1-indenyl)(3-trimethylsilylcyclopentadienyl)zirconium dichloride, methylphenylmethylene(4,5,6,7-tetrahydro-1-indenyl)(3-trimethylsilylcyclopentadienyl)zirconium dichloride.

Another possible embodiment of the process according to the invention uses a salt-type compound of the formula $R_xNH_{4-x}BR'_4$ or of the formula $R_3PHBR'_4$ as cocatalyst instead of or in addition to an aluminoxane.

Here, x=1, 2 or 3, R=alkyl or aryl, identical or different, and R'=aryl, which may also have been fluorinated or partially fluorinated. In this case the catalyst is composed of the reaction product of a metallocene with one of the compounds mentioned (EP-A-0 277 004).

Any solvent added to the reaction mixture is a common inert solvent, such as an aliphatic or cycloaliphatic hydrocarbon, a gasoline fraction or hydrogenated diesel oil fraction, or toluene.

The metallocenes are preferably used in the form of their racemates. The metallocene is preferably used at a concentration, based on the transition metal, of from $10^{-1}$ to $10^{-8}$ mol, preferably from $10^{-2}$ to $10^{-7}$ mol, particularly preferably from $10^{-3}$ to $10^{-7}$ mol, of transition metal per $dm^3$ of reactor volume. The aluminoxane is used at a concentration of from $10^{-4}$ to $10^{-1}$ mol, preferably from $10^{-4}$ to $2.10^{-2}$ mol, per $dm^3$ of reactor volume, based on the aluminum content. In principle, however, higher concentrations are also possible.

The cycloolefin copolymers suitable for the purposes of the invention have glass transition temperatures of from 0 to 250° C., preferably from 20 to 200° C., particularly preferably from 50 to 180° C.

The COCs suitable for the purposes of the invention have viscosity numbers (determined in decalin at 135° C.) of from 25 to 200 ml/g, preferably from 40 to 120 ml/g, particularly preferably from 40 to 100 ml/g.

The cycloolefin copolymers present in the novel polymer blend have a particular structure, which has been described in detail in a dissertation by J. Ruchatz, Düsseldorf 1997.

Accordingly, the cycloolefin copolymers present in the novel polymer blend may have sequences of two norbornene units incorporated one after the other. Two norbornene units also correspond to the maximum possible sequence length of the cycloolefin copolymers present in the novel polymer blend.

Surprisingly, it has been found that the blend of the cycloolefin copolymers described with conventional impact modifiers gives materials with particularly high impact resistance.

The cycloolefin copolymers present in the novel polymer blend also have an elongation at break E of $E \geq -0.0375 \cdot Tg+12$, preferably of $E \geq -0.0375 \cdot Tg+17$, particularly preferably of $E \geq -0.0375 \cdot Tg+22$.

The cycloolefin copolymers present in the novel polymer blend also have a plateau modulus G'p given by log $G'p \geq -0.0035 \cdot Tg+6$, preferably log $G'p \geq -0.0035 \cdot Tg+6.03$, particularly preferably log $G'p \geq -0.0035 \cdot Tg+6.06$.

The core-shell particles present in the novel polymer blend have two (core and one shell) or more (core and more than one shell) alternating layers of different polymers. A feature of all of these particles is that the individual layers are composed of polymers with different glass transition temperatures Tg. Polymers with a low glass transition temperature are termed rubber phase here and polymers with a high glass transition temperature are termed hard phase.

Particles of this type may be prepared by emulsion polymerization, for example. One or more layers may be crosslinked chemically during the preparation in order that the shape and size of the core-shell particle do not alter during subsequent blending with COC.

Possible uncrosslinked base materials for the crosslinked rubber phases are polymer systems whose glass transition temperatures are below 0° C., preferably below –20° C. and particularly preferably below –40° C. Suitable polymers are in principle all of those which have glass transition temperatures of this type and are suitable for synthesizing core-shell particles.

Core-shell particles whose rubber phases have particularly low glass transition temperatures Tg are particularly suitable for preparing polymer blends which are used for low-temperature applications.

The glass transition temperatures of the rubber phases can frequently not be measured individually, but can be determined by preparing and isolating an emulsion polymer of the relevant monomeric composition and determining the glass transition temperature. Another method for determining the glass transition temperatures of the rubber phases is to measure dynamic mechanical properties of the novel polymer blends and those of the matrix polymers alone. Maxima in the mechanical loss factor curves can be taken as a measure of the glass transition temperatures.

The percentage by volume of rubber phases present in core-shell particles suitable for the purposes of the invention, based on the total volume of the particles, is from 10 to 90, preferably from 20 to 70 and particularly preferably from 30 to 60.

The percentage by volume of hard phases present in core-shell particles suitable for the purposes of the invention, based on the total volume of the particles, is from 90 to 10, preferably from 80 to 30 and particularly preferably from 70 to 40.

The preparation of core-shell particles is well known and described in detail in, for example, U.S. Pat. No. 3,833,682, U.S. Pat. No. 3,787,522, DE-A-2 116 653, DE-A-22 53 689, DE-A-41 32 497, DE-A-41 31 738, DE-A-40 40 986, U.S. Pat. No. 3,125,1904 and DE-A-33 00 526.

The polymers used as rubber phase of the core-shell particles may be homo- or copolymers composed of two or more types of monomer. A feature shared by these homo- and copolymers is a glass transition temperature below that of COC.

The homo- or copolymers here may derive from the following monomers:

Conjugated diene monomers, such as butadiene, isoprene and chloroprene, monoethylenically unsaturated monomers, such as alkyl and aryl acrylates, where the alkyl radicals may be linear, cyclic or branched and the aryl radicals may themselves have substitution, alkyl and aryl methacrylates, where the alkyl radicals may be linear, cyclic or branched and the aryl radicals may themselves have substitution, substituted alkyl and aryl methacrylates and acrylates, where the substituents may be linear, cyclic or branched alkyl radicals or substituted aryl radicals, acrylonitrile and substituted acrylonitriles (e.g. methacrylonitrile, alpha-methyleneglutaronitrile, alpha-ethylacrylonitrile, alpha-phenylacrylonitrile), alkyl- and arylacrylamides and substituted alkyl- and arylacrylamides, vinyl esters and substituted vinyl esters, vinyl ethers and substituted vinyl ethers, vinylamides and substituted vinylamides, vinyl ketones and substituted vinyl ketones, vinyl halides and substituted vinyl halides, olefins with one or more double bonds, as used, for example, for preparing olefinic rubbers, in particular ethylene, propylene, butylene and 1,4-hexadiene, and also vinylaromatic compounds, such as styrene, alpha-methylstyrene, vinyltoluene, halostyrenes and tert-butylstyrenes.

Rubber phases based on organopolysiloxanes of the formula below may also be used for building up core-shell particles:

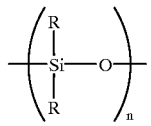

where R are identical or different alkyl or alkenyl radicals having from 1 to 10 carbon atoms, aryl radicals or substituted hydrocarbon radicals. The alkyl and alkenyl radicals here may be linear, branched or cyclic.

It is also possible to use rubber phases based on fluorinated monoethylenically unsaturated compounds, such as tetrafluoroethylene, vinylidene fluoride, hexafluoropropene, chlorotrifluoroethylene and perfluoro(alkyl vinyl) ethers.

The rubber phases may also have crosslinking, and for this use may be made of polyfunctional unsaturated compounds, such as those described in DE-A-1 116 653, U.S. Pat. No. 3,787,522 and EP-A-0 436 080. Also described in these publications is the use of grafting-on monomers. These compounds are used for chemical linking, if desired, of a possible further shell to the phase underlying this.

To obtain polymer blends with good impact resistance, even at low temperatures, preference is given to core-shell particles whose rubber phases are based on butadiene.

To obtain polymer blends with good weathering resistance, preference is given to core-shell particles whose rubber phases are based on acrylates.

Core-shell particles whose rubber phases are based on organosiloxanes are preferred if the polymer blend is to combine good impact resistance at low temperatures, good weathering resistance and good stability during preparation and processing from the melt.

The polymers which may be used for the hard phases of the novel core-shell particles are homo- and copolymers. The copolymers here may be composed of two or more monomers. A feature shared by appropriate homo- and copolymers is a glass transition temperature above 50° C.

The homo- and copolymers here may derive from the following monomers:

Monoethylenically unsaturated compounds, such as alkyl and aryl acrylates, where the alkyl radicals may be linear, cyclic or branched and the aryl radicals may themselves have substitution, alkyl and aryl methacrylates, where the alkyl radicals may be linear, cyclic or branched and the aryl radicals may themselves have substitution, substituted alkyl and aryl methacrylates and acrylates, where the substituents may be linear, cyclic or branched alkyl radicals or substituted aryl radicals, acrylonitrile and substituted acrylonitriles (e.g. methacrylonitrile, alpha-methyleneglutaronitrile, alpha-ethylacrylonitrile, alpha-phenylacrylonitrile etc.), alkyl- and arylacrylamides, vinyl esters and substituted vinyl esters, vinyl ethers and substituted vinyl ethers, vinylamides and substituted vinylamides, vinyl ketones and substituted vinyl ketones, vinyl halides and substituted vinyl halides, olefins (e.g. ethylene, propylene, butylene), cyclic olefins (e.g. norbornene, tetracyclododecene, 2-vinylnorbornene), fluorinated monoethylenically unsaturated compounds, such as tetrafluoroethylene, vinylidene fluoride, hexafluoropropene, chlorotrifluoroethylene and perfluoro (alkyl vinyl) ethers, and also vinylaromatic compounds of the formula:

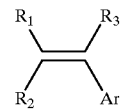

where $R_1$, $R_2$, and $R_3$ are hydrogen, or linear, branched or cyclic alkyl radicals, or substituted or unsubstituted aryl radicals, which may be identical or different, and Ar is an aromatic $C_6$–$C_{18}$ radical which may additionally bear substituents, such as alkyl or halogen radicals.

The hard phases may have crosslinking, and to this end use may be made of polyfunctional unsaturated compounds, such as those described in DE-A-2 116 653, U.S. Pat. No. 3,787,522 and EP-A-0 436 080. Also described in these publications is the use of grafting-on monomers. These compounds are used for chemical linking, if desired, of a possible further shell to the phase underlying this.

Polymers which are possible uncrosslinked base materials for the hard phases have glass transition temperatures above 50° C., preferably above 80° C. and particularly preferably above 100° C.

The novel polymer blend may also comprise commercially available core-shell particles, such as Staphyloid grades from TAKEDA Chem. Industries, for example those described in JP 17514 or JP 129266, Kane-Ace grades from KANEKA, described, for example, in the Kane ACE-B product brochure, Metablen C, Metablen W and Metablen E grades from METABLEN Company BV, described in the Metablen product brochure, Blendex grades from GE PLASTICS or Paraloid grades from ROHM and HAAS, described, for example, in Gächter/Müller Kunststoff-Additive [Plastics Additives], Carl Hanser, Munich (1983) pages XXIX et seq. or in the PARALOID BTA 733 brochure, Impact Modifiers for Clear Packaging (1987) from Rohm and Haas or in the PARALOID BTA-III N2 BTA-702 BTA 715 brochure (1989) from Rohm and Haas.

If core-shell particles are used as impact modifiers, the novel polymer blends comprise from 2 to 50% by weight, preferably from 10 to 40% by weight and particularly preferably from 10 to 25% by weight, of core-shell particles, based on the entire blend.

As an alternative to core-shell particles, the impact modifiers used may be copolymers which are composed to some extent of rubbers with low glass transition temperatures.

The block polymers present in the novel blend contain one or more block types with a glass transition temperature >40° C. and one or more block types with a glass transition temperature <−20° C. Preference is given to structural COC polymers which have alternating blocks of different cycloolefin content (EP-A-0 560 090, expressly incorporated herein by way of reference) and to block polymers obtained by anionic polymerization. Di-and triblock copolymers are preferred.

The block types with a glass transition temperature >40° C. are preferably composed of polymers which are prepared by anionic polymerization, for example polystyrene, polyesters or polyurethanes. The block types with a glass transition temperature <−20° C. are preferably composed of homo- or copolymers which contain polybutadiene, polysiloxane, polyisoprene, hydrogenated polybutadiene or hydrogenated polyisoprene.

If the copolymers used are composed to some extent of rubbers with low glass transition temperatures, the novel polymer blends comprise, based on the entire blend, from 2 to 50% by weight, preferably from 10 to 40% by weight, particularly preferably from 10 to 25% by weight, of copolymers as impact modifiers.

Other impact modifiers which may be used for the purposes of the invention include combinations of one or more of the core-shell particles described above and one or more of the copolymers described above which are composed to some extent of rubbers with low glass transition temperatures.

If this combination of impact modifiers is used, the novel polymer blends comprise from 2 to 50% by weight, preferably from 10 to 40% by weight, particularly preferably from 10 to 25% by weight, of the combination, based on the entire blend, and the constituents of the combination may be present in any desired mixing ratio.

To achieve very high transparency of the polymer blends, suitable core-shell particles and copolymers which are composed to some extent of rubbers with low glass transition temperatures are those with average refractive indices (volume-average) of from 1.52 to 1.55, preferably from 1.53 to 1.54. The selection of ideal refractive indices and radius relationships for the particles in any particular case is determined as in Makromol. Chem. 183 (1990), 221 for particles made from a core and one shell or as in M. Kerker, The Scattering of Light, Academic Press (1969), Chapter 5.4 for particles with more than one shell. Core-shell modifiers with a multilayer structure, composed of a core and of more than one shell, are particularly suitable for obtaining transparent impact-modified polymer blends.

The novel polymer blends are prepared at temperatures above the glass transition temperature of the cycloolefin polymer at from 60 to 350° C., preferably from 100 to 150° C. and particularly preferably from 110 to 130° C.

The novel polymer blends may be prepared by conventional processes (D. D. Walsh, Comprehensive Polymer Science, Pergamon Press (1989), Chapter 5.2; J. L. White and K. Min, Comprehensive Polymer Science, Pergamon Press, (1989), page 285 et seq.) In particular, the components in the form of powders or pellets may be processed by extruding them together from the melt to give pellets or chips which can then be converted into molded structures, e.g. by compression molding, extrusion or injection molding. The novel polymer blend is particularly suitable for producing moldings by injection molding, injection blow molding, extrusion blow molding or extrusion. The novel polymer blend may also be used to produce films or fibers.

The novel polymer blends may in particular be prepared via masterbatches. For this, core-shell particles and/or copolymers which are composed to some extent of rubbers with low glass transition temperatures are mixed in amounts of from 20 to 80% by weight, based on the weight of the entire polymer blend, with one or more cycloolefin copolymers (preferably by extruding them together) and then brought to the desired final concentration by further mixing with one or more cycloolefin copolymers (preferably by extruding them together). This method gives good dispersion of the impact modifiers and is preferred for producing polymer blends with contents of from 3 to 25% by weight of impact modifiers, based on the weight of the entire polymer blend.

The novel polymer blend has an elongation at break of from 4 to 200%, preferably from 5 to 100%, particularly preferably from 10 to 30%, and notched impact strength of from 2.5 to 100 KJ/m$^2$, preferably from 4 to 50 KJ/m$^2$, particularly preferably from 10 to 30 KJ/m$^2$. The novel polymer blend comprising at least one amorphous cycloolefin copolymer has high resistance to temperature variation and chemicals resistance.

The polymer blends may contain conventional amounts of additives, such as plasticizers, UV stabilizers, optical brighteners, antioxidants, antistats and heat stabilizers, or reinforcing additives, such as glass fibers, carbon fibers, or high-modulus fibers, such as polyaramids or liquid-crystalline polyesters or the like. They may also comprise fillers, such as inorganic materials, talc, titanium dioxide or the like.

The novel polymer blend is suitable for a wide variety of applications, such as containers, bottles and drinking cups, and applications in medical technology, such as blister packs and injection moldings for anesthesia, artificial respiration, pediatrics and equipment for medical care, household products, such as cutlery, microwave cookware, freezer containers, bowls, troughs, trays and tubs, in particular bathtubs, clothes pegs, toilet seats, water faucets, furniture, luggage, in particular shell-type luggage, flower vases, lids and closures for bottles, toys, such as building blocks and pedal cars, lamp housings, percussion drills, belt grinders, vibrating grinders and sanders, buzz saws, and low-temperature applications, such as refrigerator inserts or freezer parts, cable sheathings, pipes, sports equipment, such as safety helmets, ship's hulls and surfboards, internal fittings for automobiles, such as trims or dashboards, external fittings for automobiles, such as bumpers, door paneling and wheel caps, and semifinished products, such as gaskets, pipe connectors and cable ties.

The novel polymer blend has high flexural strength and high environmental stress cracking resistance, and also good melt stability. It has good weldline strength and good flowabiiity, particularly advantageous for injection molding applications. Its mechanical properties, such as heat distortion temperature, elongation at break and notched impact strength, can be varied within a wide range to give access to a wide variety of applications.

The glass transition temperatures Tg given in the examples which follow were determined using DSC (Differential Scanning Calorimetry) with a heating rate of 20° C./min. The viscosity numbers VN given were determined to DIN 53728 in dichlorobenzene at 135° C. The weight-average molar mass and polydispersity were determined using GPC.

Elongations at break and yield stresses were determined from tensile tests in accordance with ISO 527 Parts 1 and 2, the speed for the test being set at 50 mm/min.

The melt rheology properties for plateau modulus determination were determined in a dynamic vibration test using Rheometrics shear-rate-controlled equipment with plate-plate geometry at frequencies of $10^{-1}$ to $5 C 10^2 5^{-1}$.

The yield of polymer per unit of time and per mmol of metallocene is utilized to measure the activity of the catalyst:

$$\text{Activity} = \frac{\text{polymer [g]}}{\text{unit of time [h]} \times \text{amount of metallocene [mmol]}} = A$$

The following examples describe the invention in more detail:

EXAMPLES

Blend preparation

The mixtures were prepared on a Haake TW 100 laboratory extruder, a conical twin-screw extruder, with intensive-mixing screws and a 1.7 mm die. For Examples 3 to 7 and Comparative Examples 3 to 7 processing ;temperatures were 140/200/210/205° C. and rotation rate was 75 rpm. For Examples 8 to 14 and Comparative Examples 8 to 14 processing temperatures were 160/230/240/235° C. and rotation rate was 100 rpm. Test specimens were produced on a Kraus-Maffei KM 90-210 injection molding machine. For Examples 3 to 7 and Comparative Examples 3 to 7 the temperature profile was 250/250/245/240° C., injection pressure was 37 bar, hold pressure time was 10 s, mold temperature was 60° C., hold pressure was 36 bar and cooling time was 90 s. For examples 8 to 14 and Comparative Examples 8 to 14 temperature profile was 270/270/265/265° C., injection pressure was 35 bar, hold pressure time was 10 s, mold temperature was 110° C., hold pressure was 36 bar and cooling time was 90 s.

Preparation of the cycloolefin copolymers

Examples 1 and 2

A 40% strength by weight solution of norbornene in toluene was charged to a 70 dm$^3$ autoclave which had previously been flushed with ethene. The solution was saturated with ethene by repeated exposure to ethene under pressure. A toluene solution of methylaluminoxane (10% strength by weight of methylaluminoxane of molar mass 1300 g/mol determined cryoscopically) was metered countercurrently into the reactor prepared in this way, followed by stirring at 70° C. for 30 minutes. After 30 minutes'preactivation, a solution of 9 mg in total of the metallocene isopropylene (1-indenyl)(3-isopropylcyclopentadienyl)zirconium dichloride in toluene was added.

Polymerization was carried out for one hour with stirring and with further feed of ethylene to hold the ethylene pressure constant at 20 bar.

After the end of the reaction time, the polymerization mixture was discharged into a vessel and immediately introduced into 300 dm$^3$ of acetone and stirred for 30 minutes, and the precipitated product was then filtered. The filter cake was washed three times, in each case alternately with 10% strength hydrochloric acid and acetone, and the residue was slurried in acetone and filtered again. The purified product obtained was dried in vacuo (0.2 bar) at 40° C. for 24 hours.

This gave 4.9 kg of a colorless polymer with a VN of 67 ml/g, a glass transition temperature of 82° C. and a plateau modulus G'p of 600,000. This product is termed COC 1 below. COC 2 was prepared using the same catalyst, but in contrast to the procedure given above 39 mg of catalyst were used, the total pressure was 7 bar, the ethylene pressure was 1.1 bar and the total ethylene consumption was 2000 g. This gave 6.5 kg of a polymer with a glass transition temperature of 137° C., a viscosity number of 53 ml/g and a plateau modulus G'p of 480,000.

Comparative Examples 1 and 2

Comparative Example 1 was prepared from a 46% strength by weight norbornene solution in toluene with 30 mg of the metallocene isopropylenebis(1-indenyl)zirconium dichloride. The ethylene pressure was 20 bar and the hydrogen pressure was 2000 ppm. The resultant polymer has a glass transition temperature of 86° C., a viscosity number of 62 ml/g and a plateau modulus G'p of 420,000. This product is termed COC 3.

Comparative Example 2 was prepared from a 60% strength by weight norbornene solution in decalin with 70 mg of isopropylene(cyclopentadienyl) (1-indenyl)zirconium dichloride. The ethylene pressure was 12 bar. The resultant polymer has a glass transition temperature of 140° C., a viscosity number of 63 ml/g and a plateau modulus G'p of 300,000. This product is termed COC 4.

Description of the modifiers used

Kane Ace B582 is a core-shell modifier with a core-shell ratio of 70:30, purchased from Kaneka. The core is composed of an uncrosslinked butadiene-styrene copolymer and the shell of methyl methacrylate-styrenebutyl acrylate.

Paraloid EXL 2600 is a core-shell modifier based on MBS (methyacrylate-butadiene-styrene), obtainable from Rohm & Haas.

Kraton D 1184 CS is a commercial product from German Shell. It is a branched styrene-butadiene block copolymer with a proportion of 30% of styrene, a Shore A hardness of 75 and 820% elongation at break.

Septon 1050 is a product of Kuraray Europe GmbH. It is a styrene-ethylene-propylene block copolymer with a proportion of 50% styrene, a Shore A hardness of 97 and greater than 100% elongation at break.

Septon 2104 is another product from Kuraray Europe GmbH. It is a styrene-ethylene-propylene-styrene block copolymer with a styrene content of 65%, a Shore A hardness of 98 and greater than 100% elongation at break.

| Specimen | COC | Modifier: amount (% by weight) based on entire blend | Notched impact strength (kJ/m$^2$) |
|---|---|---|---|
| Example 3 | COC 1 | | 2.2 |
| Comp. Example 3 | COC 3 | | 2.1 |
| Example 4 | COC 1 | 20% Kane-Ace B 582 | 14.2 |
| Comp. Example 4 | COC 3 | 20% Kane-Ace B 582 | 10.7 |
| Example 5 | COC 1 | 20% Paraloid EXL 2600 | 10.4 |
| Comp. Example 5 | COC 3 | 20% Paraloid EXL 2600 | 5.4 |
| Example 6 | COC 1 | 4% Kraton D 1184 CS + 1.4% Septon 1050 + 0.8% Septon 2104 | 8.3 |
| Comp. Example 6 | COC 3 | 4% Kraton D 1184 CS + 1.4% Septon 1050 + 0.8% Septon 2104 | 4.6 |
| Example 7 | COC 1 | 16% Kane-Ace B 582 + 2.6% Kraton D 1184 CS + 0.9% Septon 1050 + 0.5% Septon 2104 | 15.0 |
| Comp. Example 7 | COC 3 | 16% Kane-Ace B 582 + 2.6% Kraton D 1184 CS + 0.9% Septon 1050 + 0.5% Septon 2104 | 11.0 |
| Example 8 | COC 2 | | 1.7 |

-continued

| Specimen | COC | Modifier: amount (% by weight) based on entire blend | Notched impact strength (kJ/m²) |
|---|---|---|---|
| Comp. Example 8 | COC 4 | | 1.7 |
| Example 9 | COC 2 | 5% Kane-Ace B 582 | 3.5 |
| Comp. Example 9 | COC 4 | 5% Kane-Ace B 582 | 2.0 |
| Example 10 | COC 2 | 10% Kane-Ace B 582 | 4.2 |
| Comp. Example 10 | COC 4 | 10% Kane-Ace B 582 | 2.7 |
| Example 11 | COC 2 | 20% Kane-Ace B 582 | 6.3 |
| Comp. Example 11 | COC 4 | 20% Kane-Ace B 582 | 4.2 |
| Example 12 | COC 2 | 20% Paraloid EXL 2600 | 6.8 |
| Comp. Example 12 | COC 4 | 20% Paraloid EXL 2600 | 4.4 |
| Example 13 | COC 2 | +4% Kraton D 1184 CS + 1% Septon 1050 + 1.2% Septon 2104 | 5.4 |
| Comp. Example 13 | COC 4 | +4% Kraton D 1184 CS + 1% Septon 1050 + 1.2% Septon 2104 | 3.6 |
| Example 14 | COC 2 | 16% Kane-Ace B 582 + 2.6% Kraton D 1184 CS + 0.65% Septon 1050 + 0.75% Septon 2104 | 8.2 |
| Comp. Example 14 | COC 4 | 16% Kane-Ace B 582 + 2.6% Kraton D 1184 CS + 0.65% Septon 1050 + 0.75% Septon 2104 | 6.1 |

What is claimed is:

1. A polymer blend comprising one or more cycloolefin copolymers and a. one or more types of core-shell particles, or b. one or more copolymers which contain rubber components, or c. a combination of one or more types of core-shell particles and of one or more copolymers which contain rubber components and wherein the polymer blend has an elongation at break E of $$E \geq -0.0375 \cdot T_g + 12$$

and a plateau modulus $G'_p$ given by $\log G'_p \geq -0.0035 \cdot T_g + 6$.

2. A polymer blend as claimed in claim 1, comprising at least one cycloolefin copolymer which is prepared by polymerizing from 0.1 to 99.9% by weight, based on the total amount of the monomers, of at least one polycyclic olefin of the formula I, II, II', III, IV or V

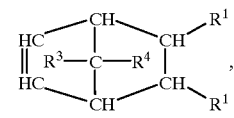  (I)

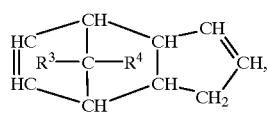  (II)

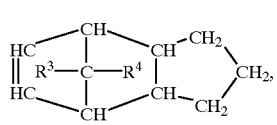  (II')

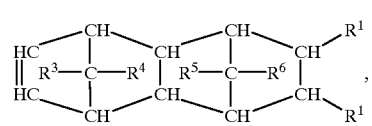  (III)

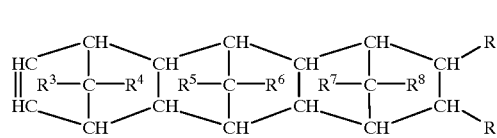  (IV)

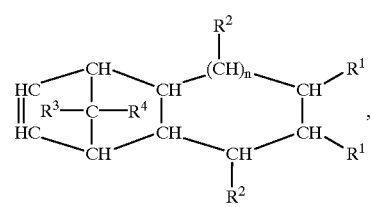  (V)

where $R^1$, $R^2$, $R^3$, $R^4$, $R^5$, $R^6$, $R^7$ and $R^8$ are identical or different and are a hydrogen atom or a hydrocarbon radical, where the same radicals in the different formulae may have a different meaning, and from 0 to 99.9% by weight, based on the total amount of the monomers, of at least one monocyclic olefin of the formula VI

  (VI)

where n is a number from 2 to 10, and from 0.1 to 99% by weight, based on the total amount of the monomers, of at least one acyclic 1-olefin of the formula VII

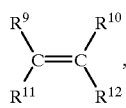

(VII)

where $R^9$, $R^{10}$, $R^{11}$ and $R^{12}$ are identical or different and are a hydrogen atom or a hydrocarbon radical.

3. A polymer blend as claimed in claim 1, wherein said cycloolefin copolymer is polymerized with at least one polycyclic olefin of the formulae I or III,

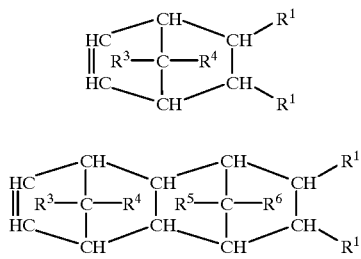

where $R^1$, $R^3$, $R^4$, $R^5$ and $R^6$, where the same radicals in the different formulae may have a different meaning.

4. A polymer blend as claimed in claim 1, wherein said cycloolefin copolymer is polymerized with an acyclic olefin of the formula VII,

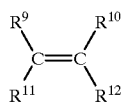

(VII)

where $R^9$, $R^{10}$, $R^{11}$ and $R^{12}$ are identical or different and are a hydrogen atom or a hydrocarbon radical.

5. A polymer blend as claimed in claim 1, where the copolymer is prepared with polycyclic olefins.

6. A polymer blend as claimed in claim 1, wherein said polycyclic olefins are norbornene and tetracyclododecene which have $C_1$–$C_6$-alkyl substitution.

7. A polymer blend as claimed in claim 1, where the copolymer is an ethylene-norbornene copolymer or an ethylene-tetracyclododecene copolymer.

8. A process for preparing the polymer blend as claimed in claim 1, which comprises optionally adding additives to the cycloolefin copolymers and said components a), b) or c) in a melt and extruding them together from the melt.

9. The process for preparing the polymer blend as claimed in claim 8, using masterbatches.

10. The polymer blend as claimed in claim 3, wherein said hydrocarbon radical is a $C_6$–$C_{10}$-aryl radical or a $C_1$–$C_8$-alkyl radical, wherein the same radicals in a different formulae may have a different meaning.

11. The polymer blend as claimed in claim 4, wherein said hydrocarbon radical is a $C_6$–$C_{10}$-aryl radical or a $C_1$–$C_8$-alkyl radical.

12. The polymer blend as claimed in claim 4, wherein $R^9$, $R^{10}$, $R^{11}$ and $R^{12}$ are identical or different and are a hydrogen atom, ethylene or propylene.

13. The polymer blend as claimed in claim 3, wherein the copolymer is prepared with polyolefins of the formulae I and III and with ethylene.

14. A molding which comprises the polymer blend as claimed in claim 1.

15. The process to prepare a molding, which comprises thermoplastic processing steps using the polymer blend as claimed in claim 1.

16. The polymer blend as claimed in claim 1, wherein said polymer has an elongation break of from 4 to 100% and a notched impact strength of from 2.5 to 100KJ/m$^2$.

17. The polymer blend as claimed in claim 16, wherein the elongation at break is from 10 to 30% and a notched impact strength is from 10 to 30KJ/m$^2$ and the blend comprising at least one or more amorphous cycloolefin copolymer.

18. The polymer blend as claimed in claim 17, which further comprises 3 to 25% by weight of impact modifiers based on the entire weight of the polymer blend.

19. A polymer blend consisting essentially of one or more cycloolefin copolymers and a. one or more types of core-shell particles, or b. one or more copolymers which contain rubber components, or c. a combination of one or more types of core-shell particles and of one or more copolymers which contain rubber components and wherein the polymer blend has an elongation break E of E≧−0.0375•Tg+17 and a plateau modulus G'p given by log G'p≧−0.0035•Tg+6.03.

20. The polymer blend as claimed in claim 1, wherein the polymer blend has an elongation break E of E≧−0.0375•Tg+22 and a plateau modulus G'p given by log G'p≧−0.0035•Tg+6.06.

* * * * *